United States Patent [19]

Cooper et al.

[11] 4,454,271
[45] Jun. 12, 1984

[54] BLENDS OF POLYPHENYLENE ETHER RESINS AND STYRENE-TERT-BUTYLSTRYENE COPOLYMERS

[75] Inventors: Glenn D. Cooper; Arthur Katchman, both of Delmar, N.Y.

[73] Assignee: General Electric Company, Pittsfield, Mass.

[21] Appl. No.: 476,389

[22] Filed: Mar. 17, 1983

Related U.S. Application Data

[62] Division of Ser. No. 327,440, Dec. 4, 1981, Pat. No. 4,389,511.

[51] Int. Cl.$^3$ ............................................. C08L 71/04
[52] U.S. Cl. ..................................... 525/132; 524/508; 525/68; 525/74; 525/92; 525/95; 525/152
[58] Field of Search .................... 525/68, 132; 524/508

[56] References Cited

U.S. PATENT DOCUMENTS

| | | | |
|---|---|---|---|
| 3,383,435 | 5/1968 | Cizek | 525/68 |
| 3,660,531 | 5/1972 | Lauchlan et al. | 525/392 |
| 3,960,811 | 6/1976 | Bennett et al. | 525/68 |
| 4,128,602 | 12/1978 | Katchman et al. | 525/68 |
| 4,172,929 | 10/1979 | Cooper et al. | 525/68 |
| 4,389,511 | 6/1983 | Cooper et al. | 525/68 |

*Primary Examiner*—J. Ziegler
*Attorney, Agent, or Firm*—Hedman, Gibson, Costigan & Hoare

[57] ABSTRACT

Homogeneous blends of polyphenylene ether resin and copolymers of styrene and 4-tert-butylstyrene are described. Rubber modifiers can be included in the copolymer or the blend. The blends are moldable into highly ductile articles having higher heat distortion temperature.

4 Claims, No Drawings

BLENDS OF POLYPHENYLENE ETHER RESINS AND STYRENE-TERT-BUTYLSTRYENE COPOLYMERS

CROSS-REFERENCE TO RELATED APPLICATION

This is a division of application Ser. No. 327,440, filed Dec. 4, 1981, now U.S. Pat. No. 4,389,511.

BACKGROUND OF THE INVENTION

The polyphenylene ether (also known as polyphenylene oxide) resins are a well known family of engineering plastics capable of being extruded, molded or otherwise shaped into articles of various shapes and sizes. A number of these resins and methods for their perparation are disclosed by Allan Hay in U.S. Pat. Nos. 3,306,874 and 3,306,875, and by Gelu Stamatoff in U.S. Pat. Nos. 3,257,357 and 3,257,358.

It is known from Cizek, U.S. Pat. No. 3,838,435, and elsewhere, that polyphenylene ethers and admixable with polystyrene to form blends having good properties.

Blends of polyphenylene ether and poly(4-tert-butylstyrene) in particular, after molding, have been found to be too brittle, with low tensile strength.

INTRODUCTION TO THE INVENTION

The discovery has now been made that certain co-polymers of 4-tert-butylstryene and styrene, unmodified or modified with rubber, can be blended with polyphenylene ether resin to produce a homogeneous (single phase) thermoplastic composition which can be molded into a ductile material having good tensile strength and good impact strength. Moreover, the composition has a higher heat distortion temperature (HDT) than the corresponding composite made with polyphenylene ether and polystyrene.

The copolymers useful in the present kinds of compositions are those in which the tert-butylstyrene content is in the range between 5% and 65% by weight, based on the total weight of the copolymer without the rubber modifier. Copolymers containing less than 5% of tert-butylstyrene do not significantly improve the heat distortion temperature of the blend, while copolymers having greater than 65% of tert-butylstyrene result in blends which after molding are brittle, with very low impact strength. The sharp drop in properties which occurs with use of a tert-butylstyrene content of greater than 65% is believed due to the incompatibility of such copolymers with polyphenylene ether resin; the blends are not homogeneous, but rather comprise two distinct phases. The styrene-t-butylstyrene copolymers can be modified with rubber to improve the ductility and impact strength of the composition.

The specified styrene-tert-butylstyrene copolymers are not compatible with polystyrene alone, and blends of these copolymers with conventional rubber modified high impact polystyrene (hereinafter also "HIPS") have lower impact strength in the moldings than blends of the same HIPS with polystyrene homopolymer. However, the further discovery has been made that addition of polyphenylene ether resin produces a homogeneous matrix, i.e., a single phase, and properties of the resultant blend of polyphenylene ether resin, styrene-tert-butylstyrene copolymer and HIPS are equal to those of blends with the same rubber and polyphenylene ether concentration made with polystyrene homopolymer in place of the styrene-t-butylstyrene copolymer.

DESCRIPTION OF THE INVENTION

The polyphenylene ether resins useful in accordance with the present compositions are well known and readily available.

The preferred polyphenylene ethers are homo- and copolymers of the formula:

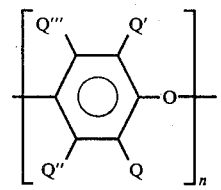

wherein Q, Q', Q" and Q"', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q"' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The compositions can also contain, as an optional ingredient, a rubber modified high impact polystyrene. The terminology "rubber modified high impact polystyrene" is used in this disclosure in its conventional sense to refer to a well known class of materials, methods for the preparation of which are known. Examples are Foster Grant's FG 834 HIPS and Amoco's 6H6 grade of HIPS.

This invention thus provides thermoplastic compositions suitable for molding which comprise polyphenylene ether resin with or without rubber modified high impact polystyrene, and a rubber modified copolymer of styrene and tert-butylstyrene; or composition which comprises polyphenylene ether resin and styrene-t-butylstyrene copolymer, with or without rubber modified high impact polystyrene.

The rubber modified styrene-tert-butylstyrene copolymers which are useful in the present kinds of compositions can be made by the procedures known for preparing conventional rubber modified high impact polystyrene (HIPS).

By way of illustration, in one procedure styrene and tert-butylstyrene in the relative amounts desired for the finished copolymer are co-polymerized by heating in the presence of a radical forming catalyst, e.g., a peroxide, and a rubber, to form a pre-polymer. Polymerization is then continued in suspension in water. The resultant polymer will comprise a copolymer of styrene and tert-butylstyrene in approximately the original relative proportions and an amount of the rubber.

The resinous ingredients are combinable in virtually all proportions in the compositions. In the preferred forms, however, the weight percent of polyphenylene ether resin to total resin weight varies from 10 to 90 percent.

The compositions can optionally also include additional resins to further modify physical and chemical properties. Such modifying resins as are described in Cizek, above, are useful, including linear, block or random copolymers of styrene an elastomeric materials, e.g., isoprene or butadiene. The additional resins include, by way of illustration, styrene containing copolymers such as styrene-acrylonitrile copolymers (SAN), styrene-butadiene copolymers, styrene-maleic anhydride copolymers, styrene-acrylonitrile-butadiene terpolymers (ABS), block copolymers of the A-B-A and A-B type where A is, for instance, polystyrene and B is, for instance, polybutadiene or polyisoprene, radial teleblock copolymers of these two materials, as well as hydrogenated forms of the block or radial teleblock copolymers in which the aliphatic unsaturation has been reduced, and acrylic resin modified styrene-butadiene copolymers.

The molding compositions of the invention can and advantageously do contain one or more of the supplementary non-resinous agents which have heretofore been customarily present in polyphenylene ether resin molding compositions to improve certain other physical and chemical properties of the moldings. The agents include flame retardants, plasticizers, anti-oxidants, strengthening fibers (for example, glass fibers and graphite whiskers), mineral fillers/reinforcements, abrasion resistant components, dyes, and pigments. Many of such agents are disclosed in U.S. Pat. No. 4,172,929 to Cooper, et al.

The supplementary non-resinous agents are present in total amount of between about 1% and 50%, on a weight basis, so as to provide the benefits which these materials have conferred in the past on shaped molded articles made from thermoplastic resins.

For applications where flammability is important, the optimum copolymer composition is from 5 to about 40% by weight of tert-butylstyrene. Copolymers containing 25% of tert-butylstyrene yield blends with polyphenylene ether resin which have a flammability equal to or slightly better than blends of the polyphenylene ether with polystyrene, but at 50% or more of tert-butylstyrene the blends have poorer flammability than blends with polystyrene. Blends of polyphenylene ether and copolymer of 25% tert-butylstyrene and 75% styrene, for instance, have good flammability and physical properties and increase the heat distortion temperature by about 20° F.

The compositions can be prepared by any of a number of procedures. In one such procedure the components are dry blended, fed through a single screw Brabender or twin screw Werner-Pfleiderer extruder, cut or ground into particles and fed to an injection molding device.

The invention is further illustrated in the examples which follow. These examples are not to be construed as limiting the invention to the particular forms shown there, but rather are intended as preferred or best embodiments. Parts are by weight unless stated otherwise.

EXAMPLE 1

Preparation of a Rubber-Modified Copolymer of Styrene and tert-Butylstyrene

A solution of 90 g of Taktene 1202 poly(butadiene) rubber in 455 g of styrene and 455 g of tert-butylstyrene (Dow Chemical Company Monomer No. CX2290; 95% para, 5% meta) was transferred to a one-gallon stainless steel reactor along with 0.6 g of benzoyl peroxide and 0.6 g of dicumyl peroxide. The reactor was purged with nitrogen and the contents were heated, while being stirred at 700 rpm by a turbine blade agitator, for 4½ hours at 90° C. (styrene conversion 28%). The prepolymer was transferred by a gear pump to a second reactor and suspended in 2000 ml of water containing 4.8 g of poly(vinyl alcohol) and 3.6 of gelatin. Polymerization was completed by heating the suspension for 5 hours at 100°, 5 hours at 120°, and 6 hours at 140° C. The mixture was cooled and the product, beads of a 50:50 copolymer of styrene and tert-butylstyrene containing 9% rubber, was filtered off, washed with water and dried.

This procedure was repeated with proportions of styrene and tert-butylstyrene varied to obtain a 25:75 copolymer and a 75:25 copolymer.

EXAMPLE 2

A mixture of 55 parts of poly(2,6-dimethyl-1,4-phenylene ether) resin (General Electric's PPO), 45 parts of tert-butylstyrene copolymer prepared as described in Example 1, 1.5 parts of polyethylene, 3.5 parts of triphenyl phosphate, 1 part of diphenyl decyl phosphite, 0.15 part of zinc sulfide and 0.15 part of zinc oxide was extruded in a 28 mm twin-screw extruder and the extruded pellets were molded into standard test pieces by means of a screw injection molding machine. Properties are listed in Table 1.

TABLE 1

| % Tert-Butylstyrene in Copolymer | Elong. % | Izod (ft. lbs./in.) | Gardner (in. lbs.) | HDT (°F.) | UL-94 | Ave. Burn (sec.) |
|---|---|---|---|---|---|---|
| 0* | 50 | 3.6 | 110 | 250 | V-1 | 16.0 |
| 25 | 60 | 3.1 | 100 | 270 | V-1 | 13.4 |
| 50 | 32 | 2.9 | 125 | 283 | drip | 37 |
| 75 | 7 | 0.6 | <5 | 279 | drip | 80 |

*Amoco 6H6 HIPS; control experiment

The blends have good tensile strength, impact strength and ductility up to a copolymer composition of 50% tert-butylstyrene, with heat distortion temperatures substantially higher than that of a blend containing ordinary rubber-modified polystyrene. Physical properties dropped sharply when the tert-butylstyrene content of the copolymer was increased to 75%. Flammability of the blend made with the copolymer containing 25% tert-butylstyrene was as good as that of the control blend, but flammability was substantially worse than the control for blends made with copolymer containing 50% or more of tert-butylstyrene.

EXAMPLE 3

A mixture of 40 parts poly(2,6-dimethyl-1,4-phenylene ether), PPO, 60 parts of rubber-modified copolymer prepared as described in Example 1, 1.5 parts of polyethylene, 8 parts of triphenyl phosphate, 1 part of diphenyl decyl phosphite, 0.15 part of zinc sulfide and 0.15 part of zinc oxide was extruded and molded as described in Example 2. Properties are listed in Table 2.

TABLE 2

| % Tert-Butylstyrene in Copolymer | Elong. % | Izod (ft. lbs./in.) | Gardner (in. lbs.) | HDT (°F.) | UL-94 | Ave. Burn (sec.) |
|---|---|---|---|---|---|---|
| 0 | 41 | 4.2 | 110 | 211 | drip | 24 |

TABLE 2-continued

| % Tert-Butyl-styrene in Co-polymer | Elong. % | Izod (ft. lbs./in.) | Gardner (in. lbs.) | HDT (°F.) | UL-94 | Ave. Burn (sec.) |
| --- | --- | --- | --- | --- | --- | --- |
| 25 | 31 | 3.5 | 100 | 228 | drip | 17 |
| 50 | 24 | 2.9 | 75 | 239 | drip | 72 |
| 75 | 7 | 0.6 | <5 | 241 | drip | 90 |

EXAMPLE 4

Copolymers of styrene and 4-tert-butylstyrene were prepared by the procedure described in Example 1, but with no rubber present. Equal weights of poly(2,6-dimethyl-1,4-phenylene ether) (PPO) and the tert-butylstyrene copolymer were dissolved in toluene, and the polymers were co-precipitated by adding the toluene solution rapidly to a large volume of rapidly stirred methanol. The co-precipitated polymer was filtered off, dried in vacuum, and compression molded into film at <500° F. A film was also prepared from a co-precipitated 1:1 mixture of ordinary polystyrene with a 50:50 copolymer of styrene and tert-butylstyrene. The films were tested in a Perkin Elmer DSC-II differential scanning calorimeter, at a heating rate of 40° C./minute, with the results listed in Table 3 below; a single transition indicates a homogeneous blend, while two transitions show the presence of two distinct phases.

TABLE 3

Glass Transition Temperatures of 50:50 Blends of Tert-Butylstyrene with other Polymers

| Copolymer Composition (% Tert-Butylstyrene) | Second Polymer | Tg (°C.) |
| --- | --- | --- |
| 0 | PPO | 141 |
| 25 | PPO | 158 |
| 50 | PPO | 169 |
| 75 | PPO | 173 & 194 |
| 100 | PPO | 160 & 210 |
| 50 | Polystyrene | 98 & 121 |

EXAMPLE 5

A mixture of 40 parts of a conventional high impact polystyrene containing 19.7% of rubber, 60 parts of styrene-4-tert-butylstyrene copolymer and 0.2 part of Irganox 1076 hindered phenolic antioxidant was blended in a twin-screw extruder. Blends were prepared from copolymers containing 25%, 50% and 75% tert-butylstyrene. A control blend was prepared from 40 parts of the high impact polystyrene and 60 parts of ordinary polystyrene. A portion of the extruded pellets from each blend was molded into test bars in a screw injection molding machine.

| Blend | % Tert-Butylstyrene in Copolymer | Izod impact strength (ft. lbs./in. n.) | (°F.) |
| --- | --- | --- | --- |
| A | 0 | 1.9 | 177 |
| B | 25 | 1.1 | 178 |
| C | 50 | 0.7 | 181 |
| D | 75 | 0.5 | 186 |

EXAMPLE 6

A mixture of 50 parts of poly(2,6-dimethyl-1,4-phenylene ether) resin (PPO), 50 parts of the blend described in Example 5 and 3 parts of triphenyl phosphate was extruded and molded as described in Example 2. Properties of the blends are summarized in Table 4. Although impact strength of the blends of HIPS with tert-butylstyrene copolymers decreases steadily with increasing tert-butylstyrene content, the blends containing PPO in addition to the HIPS and tert-butylstyrene copolymer retained impact strength, tensile strength and ductility up to 50% tert-butylstyrene, and had higher HDT than blends containing only polystyrene. Ductility, tensile strength, Izod impact strength, and Gardner impact strength all decreased sharply in blends made with the copolymer of 75% tert-butylstyrene and 25% styrene.

TABLE 4

| Blend | % Tert-Butyl-styrene in Co-polymer | Elong. % | Tensile Yld. (psi) | Izod (ft. lbs./in.) | Gardner (in. lbs) | HDT (°F.) |
| --- | --- | --- | --- | --- | --- | --- |
| E | 0 | 41 | 10,400 | 3.1 | 50 | 244 |
| F | 25 | 30 | 10,000 | 3.0 | 75 | 252 |
| G | 50 | 30 | 10,000 | 3.0 | 75 | 261 |
| H | 75 | 7 | 8,500 | 1.0 | <5 | 261 |

The above-mentioned patents and/or publications are incorporated herein by reference. Obviously, other modifications and variations of the present invention are possible, in light of the above disclosure. For instance, instead of poly(2,6-dimethyl-1,4-phenylene ether), copolymers such as poly(2,6-dimethyl-co-2,3,6-trimethyl-1,4-phenylene ether) can be used. It is, therefore, to be understood that changes may be made in the specific embodiments described without departing from the scope of the invention as defined by the appended claims.

We claim:

1. A thermoplastic composition, which comprises a homogeneous, single phase admixture of:
   (a) a polyphenylene ether resin; and
   (b) a copolymer consisting essentially of styrene and from 5% to 65% by weight of 4-tert-butyl-styrene based on the total copolymer weight.
2. A composition according to claim 1, in which the polyphenylene ether resin is poly(2,6-dimethyl-1,4-phenylene ether).
3. A composition of claim 1, which comprises polyphenylene ether resin in an amount of from 10 to 90 percent based on the total resin weight.
4. A composition according to claim 1, which further includes one or more additives selected from the group consisting of flame retardants, mineral fillers, reinforcements, antioxidants, dyes and pigments.

* * * * *